US006383586B1

(12) United States Patent
Langeland

(10) Patent No.: US 6,383,586 B1
(45) Date of Patent: May 7, 2002

(54) ADHESIVE FORMULATION

(75) Inventor: Robert J. Langeland, Grand Rapids, MI (US)

(73) Assignee: Oliver Products Company, Grand Rapids, MI (US)

( * ) Notice: Subject to any disclaimer, the term of this patent is extended or adjusted under 35 U.S.C. 154(b) by 0 days.

(21) Appl. No.: 09/716,686

(22) Filed: Nov. 20, 2000

(51) Int. Cl.[7] .............................................. B29B 22/00

(52) U.S. Cl. .......................... 428/36.1; 525/93; 525/95; 525/98

(58) Field of Search .............................. 525/95, 93, 98; 428/36.1

(56) References Cited

U.S. PATENT DOCUMENTS

| | | | |
|---|---|---|---|
| 3,630,980 A | | 12/1971 | Russell |
| 4,241,129 A | | 12/1980 | Marton et al. |
| 4,288,567 A | | 9/1981 | Feeney et al. |
| 4,367,318 A | | 1/1983 | Ishimura et al. |
| 4,430,377 A | | 2/1984 | Yoshimura et al. |
| 4,430,378 A | | 2/1984 | Yoshimura et al. |
| 4,501,634 A | | 2/1985 | Yoshimura et al. |
| 4,813,947 A | | 3/1989 | Korpman |
| 4,835,218 A | | 5/1989 | Yoshimura et al. |
| 4,948,641 A | | 8/1990 | Shantz et al. |
| RE33,832 E | | 2/1992 | Yoshimura et al. |
| 5,256,226 A | * | 10/1993 | Marzola et al. |
| 5,559,165 A | | 9/1996 | Paul |
| 5,869,562 A | | 2/1999 | Lindquist et al. |
| 5,939,483 A | | 8/1999 | Kueppers |
| 6,045,895 A | | 4/2000 | Hyde et al. |
| 6,063,838 A | | 5/2000 | Patnode et al. |
| 6,107,219 A | | 8/2000 | Joseph et al. |
| 6,107,222 A | | 8/2000 | Joseph et al. |

FOREIGN PATENT DOCUMENTS

EP 001008445 A2 * 12/1999

* cited by examiner

*Primary Examiner*—Jeffrey Mullis
(74) *Attorney, Agent, or Firm*—Price, Heneveld, Cooper, DeWitt & Litton

(57) ABSTRACT

An adhesive composition that is specifically formulated for use in packaging medical products such as catheters between a spun-bonded polyolefin non-woven fabric and an ethylene vinyl acetate copolymer film includes from about 5 to about 65 percent by weight of a low density polyethylene; from about 35 to about 90 percent by weight of an ethylene vinyl acetate copolymers; and from about 5 to about 65 percent by weight of a linear block copolymer having at least one vinyl substituted aromatic hydrocarbon polymer block and at least one polyolefin polymer block made from an aliphatic conjugated diene.

20 Claims, 1 Drawing Sheet

ADHESIVE FORMULATION

FIELD OF THE INVENTION

This invention relates to adhesive compositions, and more particularly adhesive compositions used for releasably adhering packaging materials.

BACKGROUND OF THE INVENTION

Adhesive compositions used in the packaging of sterile medical products must exhibit certain special properties. Sterile medical devices such as catheters are packaged between a spun-bonded polyolefin fiber non-woven fabric and an ethylene vinyl acetate copolymer film. The spun-bonded polyolefin fiber non-woven fabric is thermoformed, filled a medical device and sealed, around the periphery of the fabric, to the ethylene vinyl acetate copolymer film with an adhesive. The medical device is sterilized in the package by exposure to ethylene oxide gas or by irradiation with gamma radiation or an electron beam. The adhesive must securely bond the spun-bonded polyolefin fiber fabric to the ethylene vinyl acetate copolymer film, while allowing the ethylene vinyl acetate copolymer film to be peeled away from the spun-bonded polyolefin fiber fabric without causing the fabric to tear. It is also highly desirable that the adhesive leave a white transfer layer of material along the perimeter of the ethylene vinyl acetate copolymer film to indicate that a sterile seal was achieved.

A suitable adhesive for packaging of sterile medical devices between a thermoformed propylene fiber non-woven fabric and an ethylene vinyl acetate copolymer film must be adhesively strong, but cohesively weak. A suitable adhesive has a peel strength of about one pound per inch. Because the adhesive is applied over the entire surface of the ethylene vinyl acetate copolymer film, it is important that the adhesive have sufficient clarity so that the medical device in the package can be easily seen. This is especially important when the medical device is color-coded. Also, it is highly desirable that the adhesive have a relatively low coefficient of friction and relatively low tackiness. The requirements for low coefficient of friction and low tackiness are due largely to the expectations of medical personnel opening the package to retrieve a medical device.

It is preferred that the ethylene vinyl acetate copolymer film is sufficiently smooth and has sufficiently low tackiness to prevent the polyethylene vinyl acetate copolymer film from abrading or sticking to latex gloves, clothing or the like.

The adhesive compositions that have been used to adhere spun-bonded polyolefin fiber non-woven fabric to a polyethylene vinyl acetate copolymer film for medical device packaging have comprised a blend of polyethylene vinyl acetate and wax. It has been found that the known polyethylene vinyl acetate/wax blends tend to cause the lighter weight spun-bonded polyolefin fiber non-woven fabrics that are currently preferred to tear when peeled open. Also, the known adhesive blends do not exhibit other optimum properties, such as low coefficient of friction and low tackiness. Accordingly, there is a need for improved adhesive compositions for medical device product packaging that exhibit an adhesive strength of from about 0.75 to about 1.75 pounds per inch over a range of heat sealing temperatures from about 115° C. to about 135° C., while also exhibiting suitable transfer properties (to indicate a continuous sterile seal along the perimeter of the package), clarity, low coefficient of friction, and low tackiness. In order to meet processing requirements during co-extrusion of the polyethylene vinyl acetate copolymer film and adhesive, it is also desirable that the adhesive composition have a melt index of about 20 or less.

SUMMARY OF THE INVENTION

The adhesive compositions of this invention are specifically formulated for use in bonding a spun-bonded polyolefin fiber, non-woven fabric to a polyethylene vinyl acetate film for medical product packaging. In particular, the adhesive compositions of this invention are specially formulated to exhibit a desirable peel strength, transfer properties, clarity, low coefficient of friction, and low tackiness when used for bonding a spun-bonded polyolefin fiber, non-woven fabric to an ethylene vinyl acetate copolymer film.

The objectives of this invention have been met with an adhesive composition containing from about 5 to about 65 percent by weight of a low density polyethylene; from about 35 to about 90 percent by weight of an ethylene vinyl acetate copolymer; and from about 5 to about 65 percent by weight of a linear block copolymer having at least one vinyl substituted aromatic hydrocarbon polymer block and at least one polyolefin polymer block made from an aliphatic conjugated diene. The total polymer content of the composition is at least 90 percent by weight.

In one aspect of the invention, a package for medical products is provided. The package includes a spun-bonded polyolefin fiber, non-woven fabric bonded to a polyethylene vinyl acetate copolymer film with an adhesive composition containing from about 5 to about 65 percent by weight of a low density polyethylene; from about 35 to about 90 percent by weight of an ethylene vinyl acetate copolymer; and from about 5 to about 65 percent by weight of a linear block copolymer having at least one vinyl substituted aromatic hydrocarbon polymer block and at least one polyolefin polymer block made from an aliphatic conjugated diene.

These and other features, advantages and objects of the present invention will be further understood and appreciated by those skilled in the art by reference to the following specification, claims and appended drawings.

DETAILED DESCRIPTION OF PREFERRED EMBODIMENTS

Figure 1:
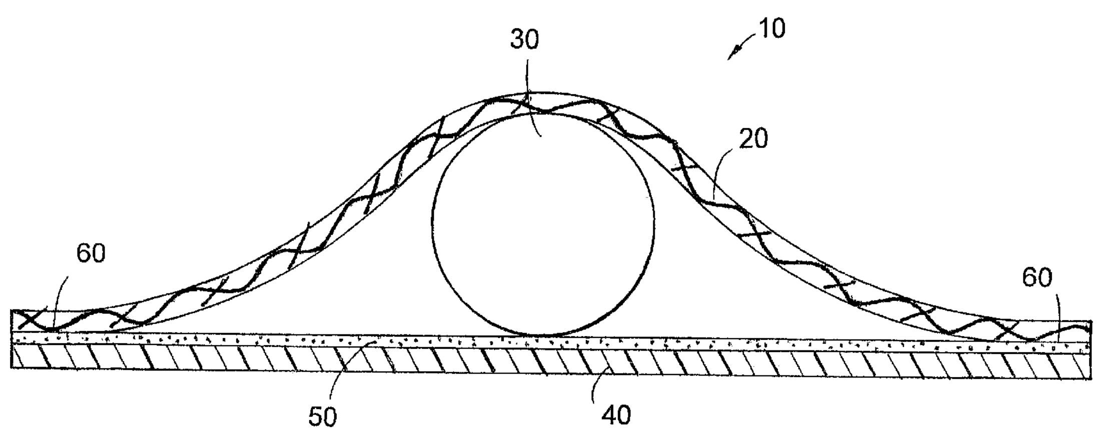
FIG. 1 is a cross-sectional view of a package for medical products in accordance with the invention.

The low density polyethylene (LDPE) may be selected from well known and commercially available low density polyethylenes. Low density polyethylenes typically have a density of not more than 0.935 g/cm$^3$, preferably not more than 0.925 g/cm$^3$, and a melt index (determined in accordance with ASTM D-1238 at 190° C.) of from about 0.2 to about 10, preferably from about 0.1 to about 5. An example of a suitable commercially available LDPE is EQUISTAR® 598 or 601 from Equistar Chemicals.

The ethylene vinyl acetate copolymer (EVA) may be selected from well known and commercially available EVA copolymers typically containing from about 9 to about 33 percent vinyl acetate by weight. Suitable EVA copolymers have a density of from about 0.93 to about 0.96 g/cm$^3$, a tensile strength of from about 900 to about 4,000 psi at 23° C., an elongation of from about 600 to about 950 percent at 23° C., a Vicat softening temperature of from about 36 to about 80° C., a Shore A hardness (ASTM D2240) of from about 73 to about 96, and a Shore B hardness (ASTM D2240) of from about 24 to about 47. Examples of suitable commercially available EVA copolymers include ELVAX® 3174, 3200, and 3326, which are available from Du Pont.

The linear block copolymers suitable for use in this invention have at least one vinyl substituted aromatic hydrocarbon polymer block and at least one polyolefin polymer block made from an aliphatic conjugated diene. Examples include styrene-butadiene block copolymer, styrene-isoprene block copolymer, carboxylic acid modified styrene-butadiene block copolymer, and carboxylic acid modified styrene-isoprene block copolymer. The block copolymers may have the general formula A-B-A (triblocks), A-B (diblocks), or other multiblock configuration, wherein the A block(s) is (are) a vinyl substituted aromatic hydrocarbon polymer block, such as a polystyrene block, and the B block is a polyolefin polymer block made from an aliphatic conjugated diene, such as a polyisoprene or polybutadiene block. Examples of suitable commercially available linear block copolymers having at least one vinyl substituted aromatic hydrocarbon polymer block and at least one polyolefin polymer block made from an aliphatic conjugated diene include KRATON® 1120 styrene-butadiene-styrene (SBS) triblock copolymer, and KRATON® 1107 styrene-isoprene-styrene. (SIS) triblock copolymer, each of which is available from Shell Chemicals.

The adhesive compositions of this invention may contain minor amounts of tackifiers, such as a phenolic modified terpene resin, fillers, such as ground calcium carbonate, and other additives. However, tackifiers, fillers, and other additives are not necessary, and are not generally preferred. Accordingly, the total polymer content of the compositions of this invention is at least 90 percent by weight, preferably at least 95 percent by weight, and more preferably at least 99 percent by weight.

The low density polyethylene component comprises from about 5 to about 65 percent by weight of the composition, more preferably from about 10 to about 25 percent by weight of the composition, and most preferably from about 15 to about 20 percent by weight of the composition. The ethylene vinyl acetate copolymer component comprises from about 35 to about 90 percent by weight of the composition, more preferably from about 40 to about 70 m percent by weight of the composition, and most preferably from about 45 to about 65 percent by weight of the composition. The linear block copolymer having at least one vinyl substituted aromatic hydrocarbon polymer block and at least one polyolefin polymer block made from an aliphatic conjugated diene comprises from about 5 to about 65 percent by weight of the composition, more preferably from about 10 to about 50 percent by weight of the composition, and most preferably from about 15 to about 25 percent by weight of the composition.

The adhesive compositions of this invention are specially formulated for use as a sealant layer for coextruded film used for packaging medical products, such as catheters, in transparent packaging materials. The compositions are heat sealable to printable packaging materials, and in particular to spun-bonded polyolefin fiber, non-woven fabrics including TYVEK® 1073B, 1059B and 2FS which are available from Du Pont. The adhesive compositions of this invention also leave clear evidence of a seal upon opening of the package, in the form of an opaque white marking of the film. The adhesive compositions have viscosities that are compatible with film coextrusion. The peel strengths of the adhesive compositions of this invention are from about 0.75 to about 1.75 pounds per inch when sealed at a wide range of sealing conditions, such as from 115° C. to 135° C.

In FIG. 1, there is shown a package 10 in accordance with the invention. Package 10 includes a spun-bonded polyolefin, non-woven fabric 20 that has been thermoformed to conform with the shape and size of a product 30, such as a catheter, contained in package 10. An ethylene vinyl acetate copolymer film 40 that is coextruded with an adhesive layer 50 is heat sealed to the spun-bonded polyolefin, non-woven fabric 20 along perimeter 60 of the package. The seal along perimeter 60 is a continuous seal that prevents contamination of product 30. Adhesive layer 50 is comprised of an adhesive composition in accordance with the invention containing from about 5 to about 65 percent by weight of a low density polyethylene; from about 35 to about 90 percent by weight of an ethylene vinyl acetate copolymer; and from about 5 to about 65 percent by weight of a linear block copolymer having at least one vinyl substituted aromatic hydrocarbon polymer block and at least one polyolefin polymer block made from an aliphatic conjugated diene.

The spun-bonded polyolefin fiber, non-woven fabric 20 may be comprised of polyethylene or polypropylene, and typically has a weight of from about 1.7 to about 2.2 ounces per square yard. The ethylene vinyl acetate film layer 40 typically has a thickness of from about 0.2 to about 10 mils, and more preferably from about 0.5 to about 5 mils. A typical thickness for adhesive layer 50 is from about 0.5 to about 2 mils.

The following non-limiting examples further illustrate the invention. Various formulations were prepared as indicated in Table 1.

TABLE 1

| | Formulations (%) | | | | | | | | | | | | |
|---|---|---|---|---|---|---|---|---|---|---|---|---|---|
| Formulations | Elvax 3174 EVA | Elvax 3200 EVA | Elvax 3326 EVA | Kraton 1650 SEBS | Kraton 1120 SBS | Kraton 1107 SIS | Equistar 601 LDPE | Picotex[1] 120 Tackifier | Equistar 598 LDPE | Adv.[2] 240 | CS-11[3] Filler | Peel Str. "@ 115 C. | Peel Str. "@ 135 C. |
| a | | | | | | | | 20 | 80 | | | 0.7 | 1.6 |
| b | | | 10 | | | | | 10 | 85 | | | 0.6 | 1.3 |
| c | | | 25 | | | | | 10 | 65 | | | 1.1 | 2.6 |
| d | | | 17 | | | | | 17 | 66 | | | 0.8 | 1.6 |
| e | | | | | | 25 | 75 | | | | | | |
| f | | | | | | 35 | 65 | | | | | | |
| g | | | | | | 50 | 50 | | | | | 0.5 | 1.5 |
| h | | | 20 | | | 40 | 40 | | | | | 1.1 | 1.9 |
| i | 20 | | | | | 40 | 40 | | | | | 1.3 | 3 |
| j | | 20 | | | | 40 | 40 | | | | | 1.4 | 3.2 |

TABLE 1-continued

| | Formulations (%) | | | | | | | | | | | | |
|---|---|---|---|---|---|---|---|---|---|---|---|---|---|
| Formulations | Elvax 3174 EVA | Elvax 3200 EVA | Elvax 3326 EVA | Kraton 1650 SEBS | Kraton 1120 SBS | Kraton 1107 SIS | Equistar 601 LDPE | Picotex[1] 120 Tackifier | Equistar 598 LDPE | Adv.[2] 240 | CS-11[3] Filler | Peel Str. "@ 115 C. | Peel Str. "@ 135 C. |
| k | | | 19 | | | 38 | 19 | 5 | 19 | | | 1.76 | 2.37 |
| l | | 19 | | | | 38 | 38 | 5 | | | | 0.74 | 1.66 |
| m | | 16 | | | | 49 | | | 33 | 2 | | 1.06 | 1.74 |
| n | | 33 | | | | 50 | | | 17 | | | | |
| o | | | 26 | | 50 | | | 2 | 20 | | 2 | | |
| p | | 20 | | | 69 | | | | 10 | | 1 | 0.8 | 1.85 |
| q | | | 25 | 50 | | | | | 25 | | | | |
| r | | 58 | | | | 25 | | | 17 | | | 1.42 | 1.86 |
| s | | | 58 | | | 25 | | | 17 | | | 1.05 | 1.2 |
| t | | 18.5 | 45.5 | | | 18 | | | 18 | | | 0.82 | 1.9 |
| u | | | 63.5 | | | 18.5 | | | 18 | | | 0.98 | 1.14 |
| v | | | 63.5 | | | 18.5 | | | 18 | | | 0.85 | 1.68 |

[1]Picotex ® 120 is a phenolic modified terpene resin.
[2]Adv. 240 (Advowax) is stearate type wax.
[3]CS-11 is ground calcium carbonate.

The amounts in Table 1 are in percentage by weight of the adhesive composition. The peel strength for the adhesive compositions were measured at sealing conditions of 115° C. and 135° C. The results of the peel strength tests are presented in Table 1 in units of pounds per inch. All seal testing was done at identical pressures and dwell times to minimize variation.

Formulations a though q are not in accordance with the invention, and formulations r through v are in accordance with the invention. Formulations a through q (not in accordance with the invention) all exhibited some undesirable properties. The viscosity for formulations a, d, e, f, and l were too low for film coextrusion. Formulations b and g exhibited undesirably low peel strengths. Formulations c, i and j exhibited undesirably high peel strengths. Formulation h failed in actual film testing. Formulation k did not exhibit the desired clarity, rendering it unsuitable for use in packaging medical properties wherein it is desirable to see the product through the package, such as when the product is color-coded. Formulation m had a melt index of 55, whereas a melt index of 20 or less is desirable. Formulation n exhibited undesirable tackiness. Formulations o and q provided an incompatible mix that could not be blended. Formulation p had a coefficient of friction that was undesirably high. The remaining formulations r through v (in accordance with the invention) exhibited desirable peel strength at sealing temperatures of 115° C. and 135° C., a viscosity suitable for coextrusion, a melt index of 20 or less, good compatibility, good clarity, an opaque white marking of the film upon opening of a package as described above, and a suitably low coefficient of friction and tackiness.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An adhesive composition comprising:

from about 5 to about 65 percent by weight of a low density polyethylene;

from about 35 to about 90 percent by weight of an ethylene vinyl acetate copolymer; and from about 5 to about 65 percent by weight of a linear block copolymer having at least one vinyl substituted aromatic hydrocarbon polymer block and at least one polyolefin polymer block made from an aliphatic conjugated diene, and a total polymer content of the composition of at least 90 percent by weight.

2. The composition of claim 1, wherein the linear block copolymer is a styrene-butadiene-styrene triblock copolymer.

3. The composition of claim 1, wherein the linear block copolymer is a styrene-isoprene-styrene triblock copolymer.

4. The composition of claim 1, wherein the ethylene vinyl acetate copolymer is present in an amount of from about 40 percent to about 70 percent by weight.

5. The composition of claim 4, wherein the low density polyethylene is present in the composition in an amount of from about 10 to about 25 percent by weight, and the linear block copolymer is present in the composition in an amount of from about 10 to about 50 percent by weight.

6. The composition of claim 5, wherein the linear block copolymer is a styrene-butadiene-styrene triblock copolymer.

7. The composition of claim 5, wherein the linear block copolymer is a styrene-isoprene-styrene triblock copolymer.

8. The composition of claim 1, wherein the ethylene vinyl acetate copolymer is present in an amount of from about 45 percent to about 65 percent by weight.

9. The composition of claim 8, wherein the low density polyethylene is present in the composition in an amount of from about 15 to about 20 percent by weight, and the linear block copolymer is present in the composition in an amount of from about 15 to about 25 percent by weight.

10. The composition of claim 9, wherein the linear block copolymer is a styrene-butadiene-styrene triblock copolymer.

11. The composition of claim 9, wherein the linear block copolymer is a styrene-isoprene-styrene triblock copolymer.

12. A package for sterile medical products, comprising:

a thermoformed spun-bonded polyolefin non-woven fabric conforming to the size and shape of a medical product, a multiple layer film including an ethylene vinyl acetate copolymer layer and an adhesive layer, the adhesive layer bonding the film to the fabric along a perimeter of the package, wherein the adhesive contains from about 5 to about 65 percent by weight of a low density polyethylene, from about 35 to about 90 percent by weight of an ethylene vinyl acetate copolymer, and from about 5 to about 65 percent by weight of a linear block copolymer having at least one vinyl substituted aromatic hydrocarbon polymer block and at least one polyolefin polymer block made from an aliphatic conjugated diene, and wherein the total polymer content of the composition is at least 90 percent by weight.

13. The package of claim 12, wherein the linear block copolymer is a styrene-butadiene-styrene triblock copolymer.

14. The package of claim 12, wherein the linear block copolymer is a styrene-isoprene-styrene triblock copolymer.

15. The package of claim 12, wherein the ethylene vinyl acetate copolymer is present in an amount of from about 40 percent to about 70 percent by weight.

16. The package of claim 15, wherein the low density polyethylene is present in the composition in an amount of from about 10 to about 25 percent by weight, and the linear block copolymer is present in the composition in an amount of from about 10 to about 50 percent by weight.

17. The package of claim 16, wherein the linear block copolymer is a styrene-butadiene-styrene triblock copolymer.

18. The package of claim 16, wherein the linear block copolymer is a styrene-isoprene-styrene triblock copolymer.

19. The package of claim 12, wherein the ethylene vinyl acetate copolymer is present in an amount of from about 45 percent to about 65 percent by weight.

20. The package of claim 19, wherein the low density polyethylene is present in the adhesive composition in an amount of from about 15 to about 20 percent by weight, the linear block copolymer is selected from the group consisting of styrene-butadiene-styrene triblock copolymer and styrene-isoprene-styrene triblock copolymer, the linear block copolymer is present in the adhesive composition in an amount of from about 15 to about 25 percent by weight, and the total polymer content of the composition is at least 95 percent by weight.

* * * * *